United States Patent
Scarlata

(10) Patent No.: US 7,711,960 B2
(45) Date of Patent: May 4, 2010

(54) MECHANISMS TO CONTROL ACCESS TO CRYPTOGRAPHIC KEYS AND TO ATTEST TO THE APPROVED CONFIGURATIONS OF COMPUTER PLATFORMS

(75) Inventor: Vincent Scarlata, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 909 days.

(21) Appl. No.: 11/511,773

(22) Filed: Aug. 29, 2006

(65) Prior Publication Data

US 2008/0059799 A1    Mar. 6, 2008

(51) Int. Cl.
*G06F 21/00* (2006.01)

(52) U.S. Cl. .................. 713/182; 713/155; 713/168; 713/176; 726/2; 726/4; 726/17; 726/21

(58) Field of Classification Search .............. 713/176, 713/182, 155, 168; 726/2, 4, 17, 21
See application file for complete search history.

(56) References Cited

U.S. PATENT DOCUMENTS

2003/0188179 A1* 10/2003 Challener et al. .......... 713/193
2004/0117318 A1* 6/2004 Grawrock ................... 705/66
2005/0235141 A1* 10/2005 Ibrahim et al. ............. 713/164
2005/0246552 A1* 11/2005 Bade et al. ................. 713/193
2008/0059799 A1* 3/2008 Scarlata .................... 713/176

* cited by examiner

*Primary Examiner*—Thanhnga B Truong
*Assistant Examiner*—Angela Holmes
(74) *Attorney, Agent, or Firm*—Schubert Osterrieder & Nickelson PLLC; Neil Cohen

(57) ABSTRACT

Methods and arrangements to control access to cryptographic keys and to attest to the approved configurations of computer platforms able to access these keys, which include trusted platform modules (TPMs) are contemplated. Embodiments include transformations, code, state machines or other logic to control access to a cryptographic key by creating an authorization blob locking authorization data to access the cryptographic key to platform configuration register (PCR) values of a TPM, the PCR values representing a configuration of a computing platform. Embodiments may also involve generating a first TPM cryptographic key bound to PCR values, receiving a second TPM cryptographic key owned by software, and receiving evidence of the identity of an upgrade service controlling the upgrading of the software. Embodiment may also include certifying the first TPM cryptographic key; certifying the second TPM cryptographic key; concatenating the first certification, the second certification, and the evidence of the identity of the upgrade service; and signing the concatenation.

27 Claims, 9 Drawing Sheets

MECHANISMS TO CONTROL ACCESS TO CRYPTOGRAPHIC KEYS AND TO ATTEST TO THE APPROVED CONFIGURATIONS OF COMPUTER PLATFORMS

FIELD

The present invention is in the field of the computer security. More particularly, the present invention relates to methods and arrangements to control access to cryptographic keys and to certify the cryptographic keys for multiple configurations of computer platforms which include trusted platform modules.

BACKGROUND

The security of computers and computer transactions is important. Data stored on computers may have high value. The data may include trade secrets and other confidential business data or personal information such as social security numbers and credit card numbers. In addition, computers are increasingly used for electronic business transactions. To improve computer security, the Trusted Computing Group (TCG), a not-for-profit industry-standards organization with the aim of enhancing the security of the computing environment in disparate computer platforms, has formed and adopted specifications for more secure computers.

TCG specifications define trusted computer platforms, computer platforms which may behave in a particular manner for a specific purpose. A trusted platform may provide data security functions such as data encryption and decryption and data storage. A key component of a trusted platform is the trusted platform module (TPM), a module which may perform cryptographic hashings to detect loss of integrity, public and secret key encryption to prevent unauthorized disclosure of data, and digital signing to authenticate transmitted information. The TCG Protected Storage mechanisms, which may be rooted in hardware, may be used to protect keys, secrets and hash values.

A trusted platform may also demonstrate that it operates in a safe configuration when it has access to confidential data by measuring the configuration and sealing the data to the configuration. TCG specifications provide for measuring the components of a computer platform and for storing the results of the measurements. The measurements of a configuration may be hashed and stored in Platform Configuration Registers (PCRs). A trusted platform may allow access to data only under a particular configuration of the trusted platform. The TPM seal operation may encrypt data to a specific set of PCR values or an authorization value. To unseal the data, and thereby gain access to it, the authorization must be presented and the set of values stored in the PCRs must match the set used in the seal operation. Similarly, a signing key may be locked to a set of PCR values during key generation within the TPM.

Changes in a platform configuration may limit the availability of sealed data or PCR locked keys. To gain access to sealed data under a modified configuration, the data may first have to be accessed under the original configuration and resealed to the modified configuration. Gaining access to the data may prove difficult when the data is distributed over multiple computer platforms. Generally, keys locked to a particular platform configuration may not be made available in other configurations. Generating a new signing key would require sending out public notice retracting the original signing key. The retraction process is very cumbersome. Some users of the signing key may not receive the notice. The list of recipients of data signed by the key may not be current. In addition, there may be a delay until the new signing key is available for use. The recipients may not frequently update their list of signing keys.

A trusted platform may issue certifications that configurations may be trusted or arrange for the certifications to be issued. One method involves executing the TPM_CertifyKey function on a key locked to a particular configuration. The result may state and certify the configuration that a key is locked to. When a key is not locked to a particular configuration, it may prove difficult to state and certify a configuration under which access to the key is available.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to control access to cryptographic keys and to attest to the approved configurations of computer platforms which include trusted platform modules (TPMs) are contemplated. Embodiments include transformations, code, state machines or other logic to control access to a cryptographic key by receiving a configuration of a computing platform which includes a TPM. The configuration may include platform configuration register (PCR) values of the TPM. The embodiments may include receiving a cryptographic key; receiving authorization data for accessing the cryptographic key; and creating an authorization blob, the authorization blob binding the authorization data to the PCR values of the TPM. Some embodiments may involve receiving a TPM data encryption key. Some embodiments may involve receiving a TPM signing key. Some embodiments may involve sealing the authorization data for accessing the cryptographic key with a TPM storage key.

Embodiments may also involve generating a first TPM cryptographic key bound to PCR values representing a current configuration of a trusted computing base and software. Embodiments may also include receiving a second TPM cryptographic key owned by the software and receiving evidence of the identity of an upgrade service controlling the upgrading of the software. Embodiment may also include certifying the first TPM cryptographic key and certifying the second TPM cryptographic key. Embodiments may also include concatenating the first certification, the second certification, and the evidence of the identity of the upgrade service. Embodiments may also include signing the concatenation.

While specific embodiments will be described below with reference to particular circuit or logic configurations, those of skill in the art will realize that embodiments of the present invention may advantageously be implemented with other substantially equivalent configurations.

Figure 1:
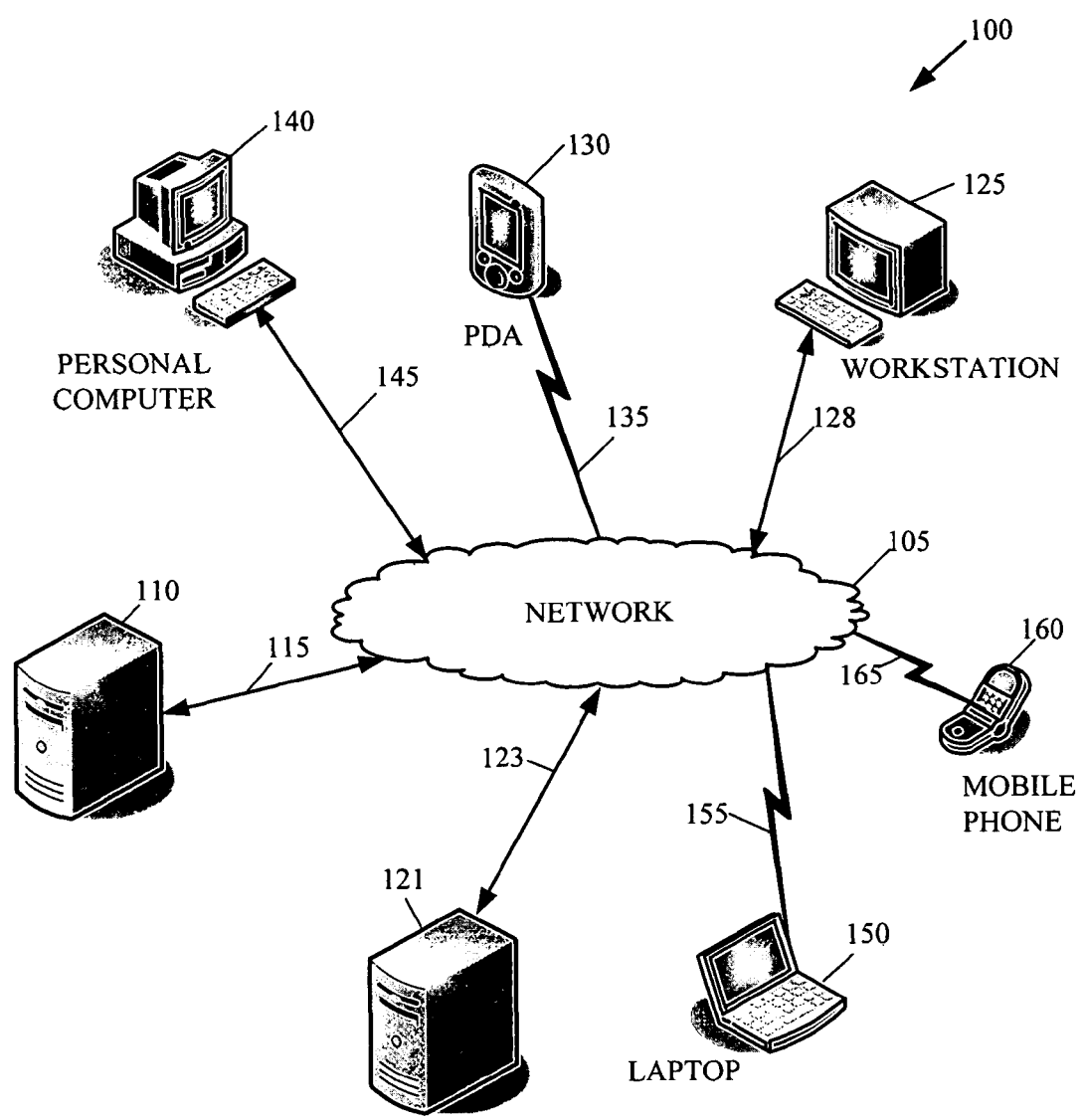
FIG. 1 depicts a network diagram of an embodiment of devices capable of controlling access to a cryptographic key and of attesting to the approved configurations of a computer platform.

FIG. 1 depicts a network diagram of an embodiment of a networked system 100 of devices capable of controlling access to a cryptographic key and of attesting to the approved configurations of a computer platform. The system 100 includes a network 105, upgrade service server 110 connected to network 105 through wireline connection 115, challenger 121 connected to network 105 through wireline connection 123, and a variety of devices capable of controlling access to a cryptographic key and of attesting to approved configurations of a computer platform (TPM devices) including:

- workstation 125, a computer coupled to network 105 through wireline connection 128,
- personal digital assistant (PDA) 130, coupled to network 105 through wireless connection 135,
- personal computer 140, coupled to network 105 through wireline connection 145,
- laptop computer 150, coupled to network 105 through wireless connection 155; and
- mobile phone 160, coupled to network 105 through wireless connection 165.

Network 105, which may consist of the Internet or another wide area network, a local area network, or a combination of networks, may provide data communications among the upgrade service server 110, the challenger 121, and the TPM devices 125, 130, 140, 150, and 160. In the embodiment of FIG. 1, upgrade service server 110 may transmit software upgrades or changes to TPM devices, examine platform configurations of TPM devices, and approve or disapprove of the platform configurations of TPM devices. In many embodiments, upgrade service server 110 may be under the control of a corporate information technology (IT) department. In alternative embodiments, upgrade service server 110 may be omitted. An upgrade service may be completely absent, or the functions of an upgrade service may be performed by an itinerant technician or a technician at a remote console.

Challenger 121 may request proof from TPM devices 125, 130, 140, 150 and 160 that only a trustworthy configuration has access to sensitive data encrypted with a cryptographic key. Challenger 121 may, for example, be a server that stores credit card information on one of the TPM devices.

TPM devices 125, 130, 140, 150 and 160 may communicate with upgrade service server 110 over network 105 to receive updates and to verify safe configurations. In addition, TPM devices 125, 130, 140, 150 and 160 may transmit over network 105 signed attestations of approved configurations of a computer platform of the TPM devices. The attestations may include certifications of a first and second TPM cryptographic key and evidence of the identity of an upgrade service.

The arrangement of the upgrade service server 110, challenger 121 and other devices making up the exemplary system illustrated in FIG. 1 is for explanation, not for limitation. Data processing systems useful according to various embodiments of the present invention may omit a server, or may include additional servers, routers, other devices, and peer-to-peer architectures, not shown in FIG. 1, as will occur to those of skill in the art. Networks in such data processing systems may support many data communications protocols, including for example TCP (Transmission Control Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
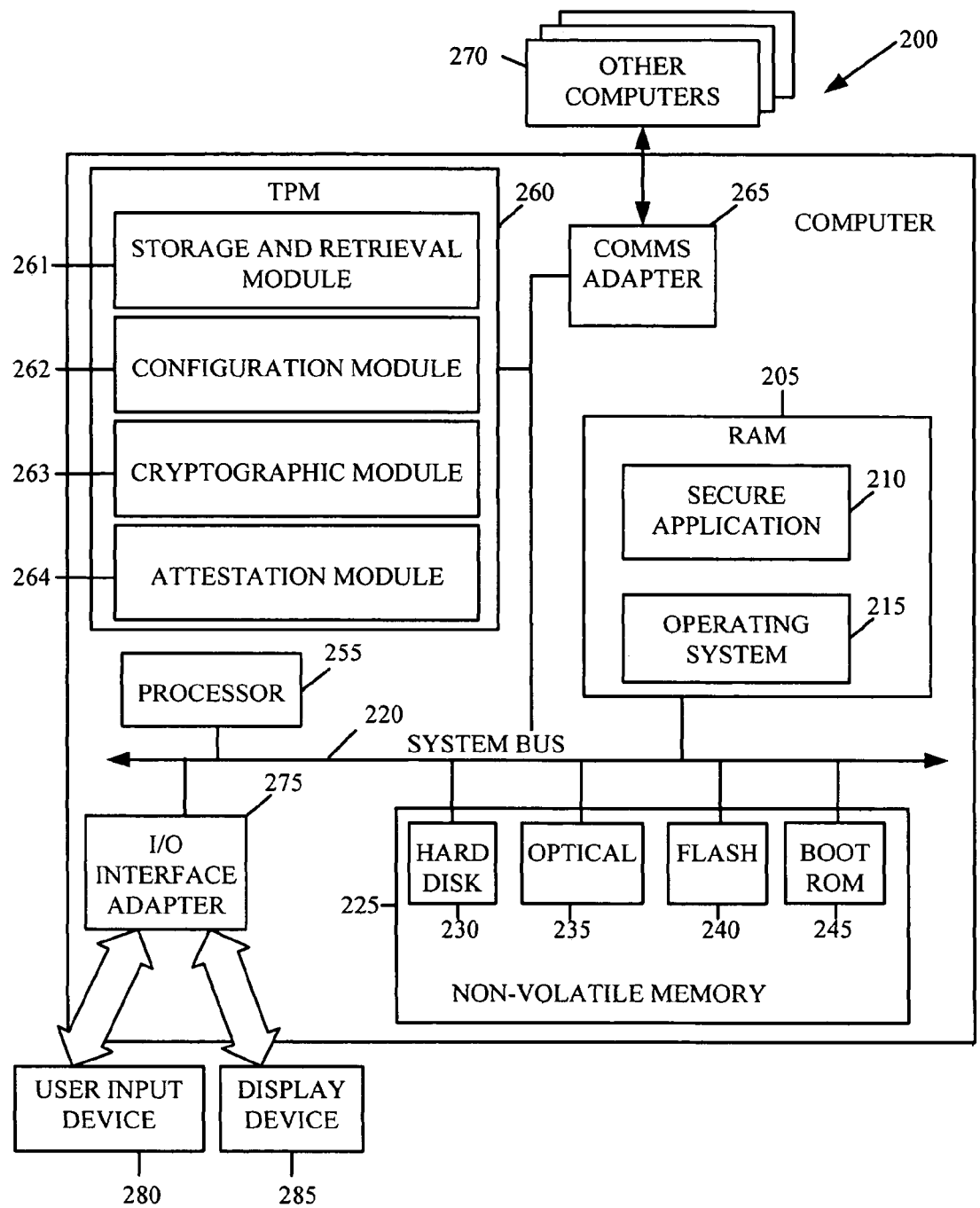
FIG. 2 depicts an embodiment of a computer capable of controlling access to a cryptographic key and of attesting to the approved configurations of a computer platform.

Turning now to FIG. 2, there is shown an embodiment of a computing platform 200 capable of controlling access to a cryptographic key by creating an authorization blob binding authorization data for accessing the key to a configuration of the computing platform 200. The embodiment of a computing platform 200 is also capable of attesting to approved configurations of computing platform 200 by signing a concatenation of a certification of a first cryptographic key, a certification of a second cryptographic key, and evidence of the identity of an upgrade service. Computing platform 200 includes both hardware and software. Computing platform 200 includes random access memory (RAM) 205, non-volatile memory 225, a processor 255 or CPU, a TPM 260, a communications adapter 265, and an Input/Output (I/O) interface adapter 275 connected by system bus 220. Stored in RAM 205 are a secure application 210 and an operating system 215. Secure application 210 may comprise computer program instructions for controlling access to a cryptographic key in TPM 260 and for accessing the cryptographic key. The computer program instructions of secure application 210 may operate by giving commands to be executed by TPM 260.

Operating system 215 may comprise UNIX®, Linux®, Microsoft Windows®, Mac OS X® or other operating systems useful for controlling access to a cryptographic key and for attesting to approved configurations of a computing platform. Secure application 210 and operating system 215 are shown in RAM 205 in FIG. 1, but many components of such software may be stored in non-volatile memory 225 also. Further, while the components of such are shown simultaneously present in RAM, in other embodiments, only some of the components of RAM 205 may be present at any given time.

Non-volatile memory 225 may be implemented as a hard disk drive 230, optical disk drive 235, electrically erasable programmable read-only memory space (EEPROM or Flash memory) 240, RAM drives (not shown), or as any other kind of computer memory as will occur to those of skill in the art. Non-volatile memory 225 may include boot ROM 245. Boot ROM 245 may consist of software which controls the booting of computing platform 200. Boot ROM 245 may control the power-on self-test (POST) of computing platform 200. The POST may perform a series of system checks. The POST may check that boot ROM is operating correctly by comparing code loaded in various portions of computing platform 200 with code stored in BIOS. During POST, an electrical signal may clear left-over data from registers. It may also set the program instruction counter to a specific address, the address of the next instruction for the processor 255 to begin executing. The address may refer to the beginning of a boot program for the processor 255 stored in the BIOS. The instructions may perform a series of system checks.

TPM 260 includes storage and retrieval module 261, configuration module 262, cryptographic module 263, and attestation module 264. Storage and retrieval module 261 may store data and may permit access to it by programs such as secure application 210 only upon authorization to make the data available. Configuration module 262 may determine the state of a configuration of computing platform 200 ("measure" a configuration). Cryptographic module 263 may perform cryptographic functions such as key generation, encryption, and decryption. Attestation module 264 may attest to approved configurations of computing platform 200. TPM 260 may perform its functions in response to commands from secure application 210 and other programs. In some embodiments, TPM 260 may be implemented in hardware. In further embodiments, TPM 260 may consist of a module similar to a smart card. In other embodiments, TPM 260 may be implemented in software.

Communications adapter 265 may implement the hardware level of data communications through which one computer sends data communications to other computers, such as other computers 270, directly or through a network. Such data communications may be carried out through serially through RS-232 connections, through external buses such as USB, through data communications networks such as IP networks, and in other ways as will occur to those of skill in the art. Examples of communications adapters include modems for wired dial-up communications, Ethernet adapters for wired network communications, and 802.11b adapters for wireless network communications.

I/O interface adapter 275 implements user-oriented I/O through, for example, software drivers and computer hardware for controlling output to display devices such as display device 285 as well as user input from user input device 280. User input device 280 may include both a keyboard and a mouse. Some embodiments may include other user input devices such as speech interpreters, bar code scanners, text scanners, tablets, touch screens, and/or other forms of user input devices.

The computing platform illustrated in FIG. 2 is for explanation, not for limitation. In some other embodiments, embedded systems, PDAs, cell phones, and other computing platforms known to those of skill in the art which contain a TPM may control access to cryptographic keys and may attest to approved configurations of the computing platform. In many other embodiments, the storage and retrieval module, the configuration module, the cryptographic module, and the attestation module may be implemented in hardware, firmware, or in state machines or may form a component of an operating system. In several other embodiments, the functions performed by the storage and retrieval module, the configuration module, the cryptographic module, and the attestation module may be carried out by more than or fewer than four separate modules. In some other embodiments, a portion of the functions of the storage and retrieval module, the configuration module, the cryptographic module, and the attestation module may be carried out by software such as secure application 210 and not by a TPM such as TPM 260.

Figure 3:
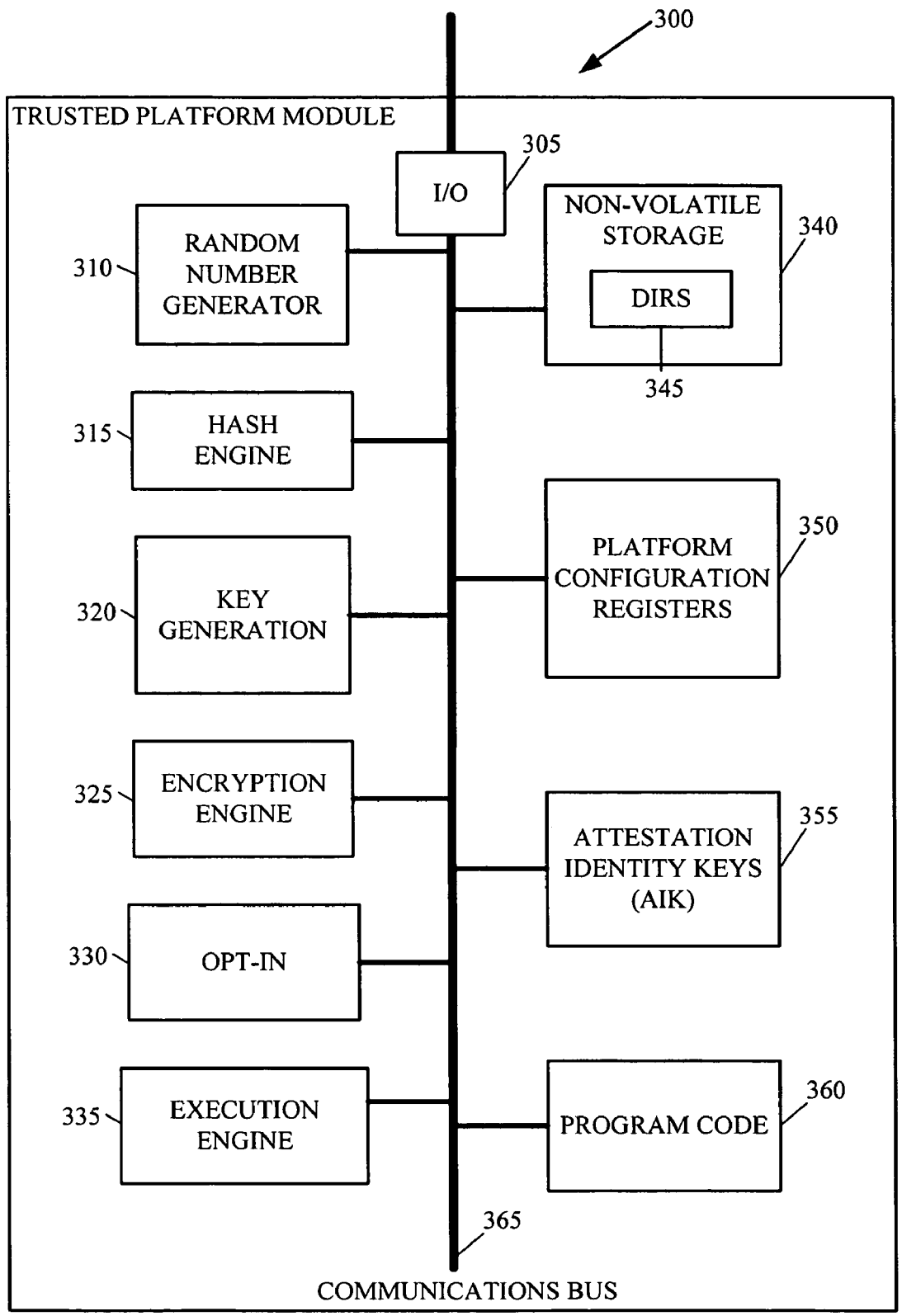
FIG. 3 depicts an embodiment of a trusted platform module.

FIG. 3 depicts an embodiment of a TPM 300 that includes a I/O module 305, a random number generator 310, a hash engine 315, a key generation module 320, an encryption engine 325, an opt-in module 330, an execution engine 335, non-volatile storage 340, platform configuration registers (PCRs) 350, attestation identity keys (AIK) module 355, and program code 360 connected by communications bus 365. I/O module 305 may control communications between the modules of the TPM 300 and may communicate with external buses. I/O module 305 may encrypt and decrypt data transmitted between TPM 300 and external modules.

Random number generator 310 may produce random numbers for use in key generation and password generation. Hash engine 315 may calculate message digests, fixed-length strings produced from input strings. The message digests may be used for digital signatures or for verifying the integrity of messages. Key generation 320 may generate cryptographic keys. The keys may include signing keys, storage keys, and attestation identity keys used by attestation identity key module 355. Encryption engine 325 may encrypt and decrypt data and may sign messages. Encryption engine 325 may use keys produced by key generation 320. Opt-in module 330 may enable a user to opt-in or opt-out of use of the TPM 300. Execution engine 335 may run code contained in program code module 360, and may perform initialization and may determine the state of configurations of the computing platform containing the TPM 300 ("measurement").

Non-volatile storage module 340 may include Data Integrity Registers (DIR) 345. DIRs 345 may be used to store states of configurations under which access to data is permitted. Platform configuration registers (PCRs) 350 are registers that may store measurements of configurations of the computing platform containing TPM 300. AIK module 355 may utilize AIKs to attest to or vouch for the accuracy of data protected by TPM 300, such as the state of configurations of the computing platform containing the TPM 300. Attestation of data by TPM 300 may include the signing of the data with an AIK. Program code 360 may contain code for measuring the state of configurations. The program code 360 may be contained in firmware.

The components of a TPM illustrated in FIG. 3 are for explanation, not for limitation. Other embodiments of a TPM may contain additional components, or may omit some of the components of FIG. 3. In other embodiments of a TPM, some of the components shown in FIG. 3 may be divided into multiple components or may be combined into a single component. In many other embodiments of a TPM, the modules may be implemented in hardware, firmware, or in state machines.

Figure 4:
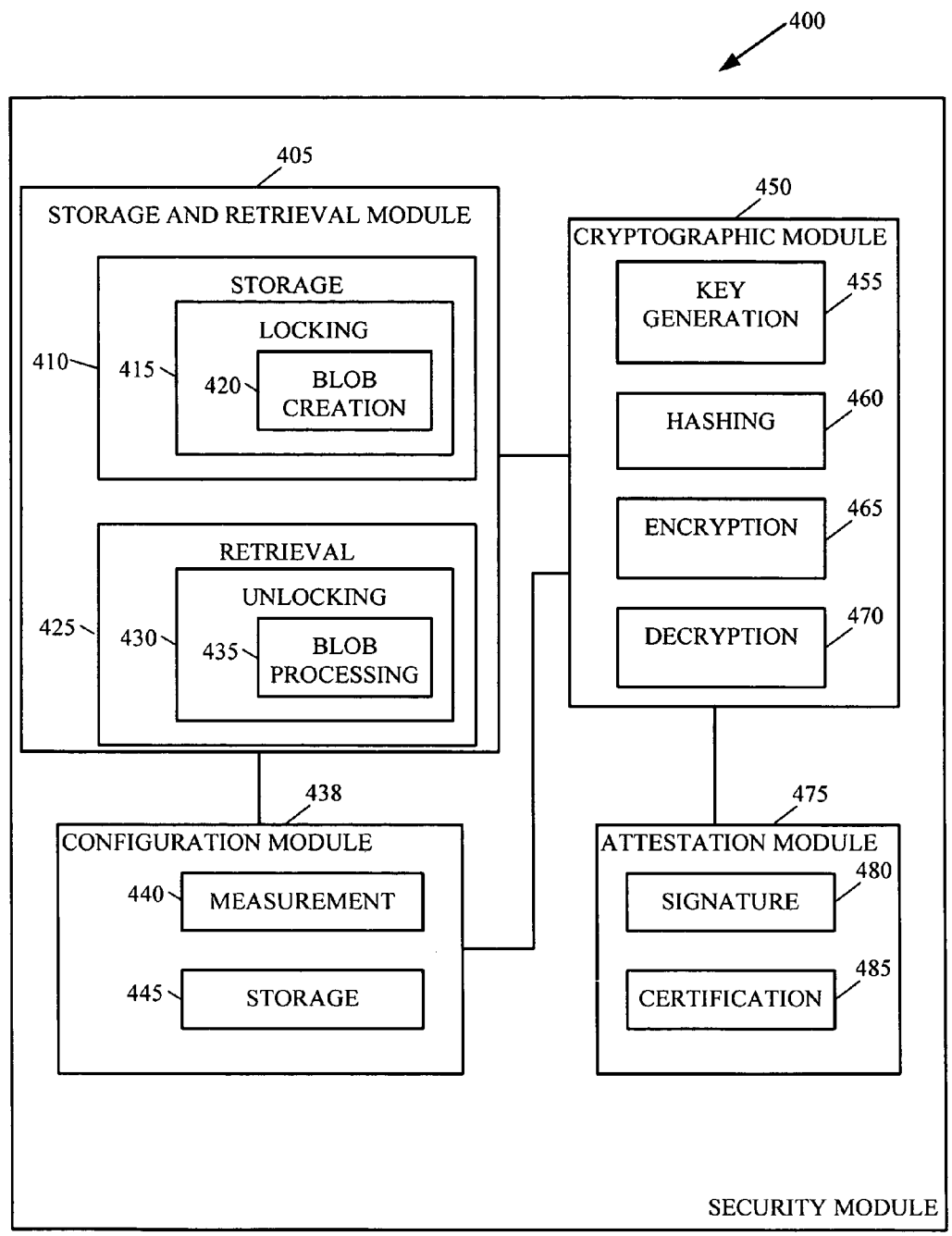
FIG. 4 depicts an embodiment of a security module to control access to a cryptographic key and to attest to the approved configurations of a computer platform.

Turning to FIG. 4, shown is an embodiment of a security module. The security module 400 of FIG. 4 includes a storage and retrieval module 405, a configuration module 438, a cryptographic module 450, and an attestation module 475. Security module 400 may control access to cryptographic keys and may attest to approved configurations of a computing platform. Storage and retrieval module 405 includes storage module 410 and retrieval module 425. Storage module 410 may store data and restrict access to the data. Storage module 410 may include locking module 415, which may include authorization blob creation module 420. Locking module 415 may lock data so that access to the data requires presentation of a password or other authorization data or a proper configuration of a computing platform.

Authorization blob creation module 420 may create blobs, data structures used by a TPM for protected storage and for saving data outside of the TPM. Blobs may contain encrypted data for use in protected storage in a TPM, or for saving context outside the TPM. The blobs may be locked to certain states or authorizations (authorization blobs). Decrypting the authorization blobs may require the existence of the state or the presentation of the authorization data. The authorization blobs may be locked to a particular TPM so that they may be decrypted only by the particular TPM. Authorization blobs may also be locked to a particular configuration of a computing platform. A TPM may seal data to a configuration of a computing platform containing the TPM by encrypting the data and cryptographically pairing the data with a measurement of the configuration. Authorization blobs may also be locked by authorization data. Authorization data may consist of a 160-bit number. Authorization blob creation module 420 may create a blob containing authorization data to access a cryptographic key. The authorization blob may be locked by a measurement of a configuration or authorization data under which access to the cryptographic key is granted.

An authorization blob may be large or small. For example, a small authorization blob may hold a single cryptographic key. In addition, authorization blobs may be structured. For example, an authorization blob may contain header information to indicate how the blob is to be interpreted when loaded into a TPM. Authorization blobs stored outside a TPM may be stored on any available storage, such as disk, flash memory, or network file server.

Retrieval module 425 may retrieve data stored by storage module 410. Retrieval module 425 includes unlocking module 430 which may include blob processing module 435. Unlocking module 430 may unlock data through the use of authorization data or a proper configuration of a computing platform. Authorization blob processing module 435 may unlock and process data stored in the form of a blob.

Configuration module 438 may measure configurations of a computing platform and may store the measurements of the configurations. Configuration module 438 may include measurement module 440 and storage module 445. Measurement module 440 may measure configurations under which access to cryptographic keys is permissible and storage module 445 may store the measurements of the configurations. Measurement module 440 may also measure a current configuration of a computing platform for comparison with stored measurements under which access to cryptographic keys is permissible.

Cryptographic module 450 includes key generation module 455, hashing module 460, encryption module 465, and decryption module 470. Key generation module may generate cryptographic keys for use in encrypting data, attesting to the accuracy of information, and signing messages. Some of the generated cryptographic keys may be stored in a TPM. A blob may bind authorization data for accessing a cryptographic key to a configuration of the computing platform containing the TPM. The cryptographic key may be accessed if the computing platform is in the configuration bound to the authorization data. Hashing module 460 may generate hashes of data for use in signatures or to prove the integrity of message transmission. Encryption module 465 may encrypt data and decryption module 470 may decrypt encrypted data. Encryption module 465 may encrypt a blob binding authorization data to access a cryptographic key to a configuration of a computing platform.

Attestation module 475 includes signature module 480 and certification module 485. Attestation module 475 may attest to the approved configurations of a computing platform by certifying a cryptographic key bound to PCR values representing a current configuration of a computing platform, certifying a second cryptographic key owned by software, and by signing a concatenation of the first certification, the second certification, and evidence of the identity of an upgrade service.

FIG. 4 is for illustration and not limitation. Other embodiments may comprise different modules with different submodules. A security module may include additional modules, may omit some of the modules of FIG. 4, and may combine modules or portions of the modules.

Figure 5:
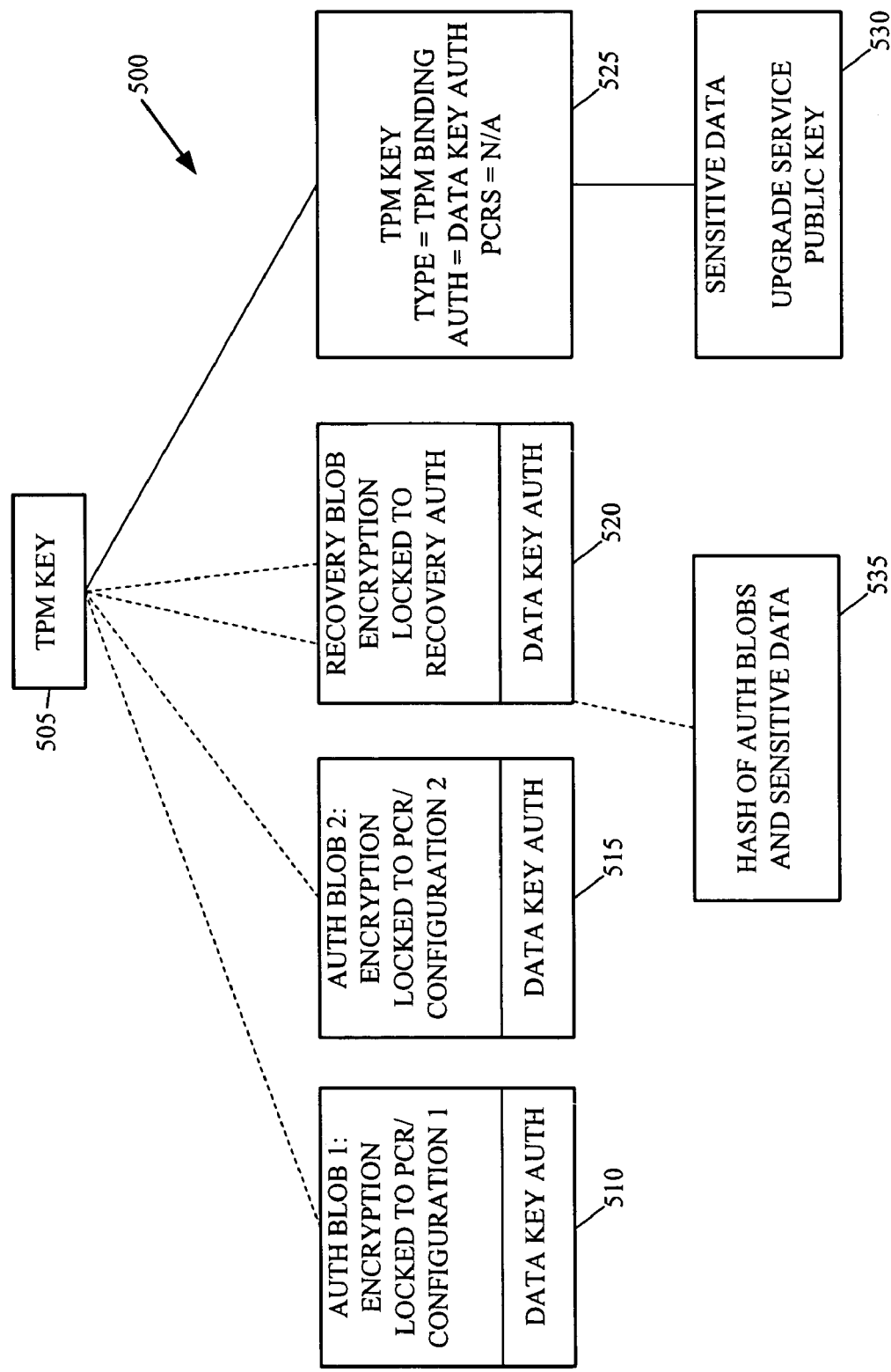
FIG. 5 depicts an exemplary data diagram which provides a template for controlling access to a cryptographic key.

FIG. 5 depicts an exemplary data diagram 500 for controlling access to a cryptographic key. The diagram includes TPM key 505, authorization blobs 510 and 515, recovery blob 520, TPM key 525, sensitive data 530, and hash 535. TPM key 505 is a cryptographic key which may be used to encrypt other data structures in FIG. 5, such as blobs 510, 515, and 520 and TPM key 525. In some embodiments, TPM key 505 may comprise a TPM storage key. A TPM storage key may consist of an asymmetric key used to encrypt data or other keys. TPM storage keys may form a hierarchy. The TPM storage root key may form the root of the hierarchy. Child keys may be wrapped by parent keys. In other embodiments, TPM key 505 may be generated outside of the TPM and imported into the TPM.

Blobs 510, 515, 520 are data structures which may be generated by a TPM for external storage of data. In the embodiment of FIG. 5, blob 510 is locked to configuration 1 of a TPM, represented by a first set of values of platform configuration registers, blob 515 is locked to configuration 2 of the TPM, and blob 520 is locked to recovery authorization, authorization data which may be possessed by a recovery authority. Recovery authority may have authority to access sensitive data in an emergency, such as a failed attempt to update a configuration of a computing platform containing a TPM or a system problem with the computing platform. In the case of corporate computing resources, recovery authority may consist of the corporate information technology (IT) department. Each of blobs 510, 515, and 520 contains data key auth, authorization data to unlock TPM key 525. Unlocking any of blobs 510, 515, 520 may make data key auth available to unlock TPM key 525. Accordingly, blobs 510, 515, and 520 constitute a type of authorization blob.

TPM key 525 is a TPM key used to encrypt sensitive data 530. TPM key 525 may consist of a TPM storage key. TPM key 525 may be encrypted by TPM key 505. Presentation of data key auth may be needed to unlock or decrypt TPM key 525, thereby making TPM key 525 available for unlocking sensitive data 530. Sensitive data 530 may include the public key of an upgrade service used to upgrade software utilizing the TPM.

The data structures of FIG. 5 may enable the unlocking of TPM key 525 to decrypt sensitive data 530 in multiple configurations of a computing platform containing a TPM. When an application that uses sensitive data is launched, the application may scan through auth blob 510 and auth blob 515 in the storage area for the auth blobs until it finds one that is locked to the values currently in the TPM PCRs. If the application finds an auth blob locked to the current PCR values, the application may decrypt the data key auth contained in the blob, and may use data key auth to unlock TPM key 525 to decrypt sensitive data 530. In further embodiments, the application able to access the sensitive data 530 in multiple configurations may consist of a virtual TPM, a logical device that provides TPM-like functionality.

If the current configuration is not one that is approved to access the data, unlocking auth blobs 510, 515 may not be possible. Recovery blob 520 may, however, enable accessing sensitive data 530 regardless of the platform configuration.

The providing of recovery auth may unlock recovery blob 520, thereby making data key auth available for unlocking TPM key 525.

The data structures of FIG. 5 may be modified to enable access to sensitive data 530 from configurations in addition to those to which auth blobs 510 and 515 are sealed. In order to enable the access to sensitive data 530 by another platform configuration, an application using sensitive data 530 may obtain the PCR values that the platform may have under the other platform configuration. For example, the other platform configuration may be installed and the PCR values measured. As another example, an upgrade service may install the other platform configuration upon a platform identical to the platform containing the TPM and may measure the configuration upon the other platform. The two platforms may have the same PCR values. The upgrade service may then provide the measurements to the application. The application may create new auth blob by encrypting a new copy of data key auth, locking it to the PCR values representing the other platform configuration. In some embodiments, the application which creates a new auth blob may consist of a virtual TPM.

An application making sensitive data 530 available under a configuration may desire some assurance that the configuration is as safe as previous configurations under which access to sensitive data 530 is available. The application may rely on an upgrade service, an authority which may be trusted to analyze the configuration and determine that it is as safe as the previous configuration. During initial creation of sensitive data 530, a public key for the upgrade service may be injected into the sensitive data. Before creating an auth blob for an additional configuration, the application may require signed approval by the upgrade service of the additional configuration.

The data structures of FIG. 5 may also be modified to delete an auth blob to prevent access to sensitive data under the configuration the auth blob is sealed to. For example, after a computing platform is updated, an auth blob locked to an outdated configuration may be deleted. In order to ensure that a cached version of an old auth blob is not used after deletion, an anti-replay mechanism may be used. An example mechanism may compare a hash of the most recently-updated set of auth blobs and sensitive data to a hash of the currently loaded auth blobs and sensitive data. The equality of the two hashes may indicate that the currently loaded auth blobs are a fresh set and not a cached old set. A hash is a mathematical operation to transform a string or message into a fixed-length output string. The hash function is devised to make it very difficult to find a message whose hash produces a given message digest. Thus, if hashes of two messages are equal, the likelihood is strong that the messages are equal.

An application that uses sensitive data 530 may hash the auth blobs and sensitive data each time the application modifies the auth blobs. The application may then store the resulting hash 535 in non-volatile storage, such as TPM non-volatile RAM or a data integrity register (DIR). A DIR may comprise another form of TPM non-volatile storage. Hash 535 may also be stored outside of the TPM. On each boot, the application may calculate a hash of the current auth blobs and sensitive data. If the hash of the current state matches hash 535, the hash of auth blobs and sensitive data stored at a previous update, then the auth blobs 510, 515 and sensitive data 530 may be fresh.

The example of FIG. 5 is for illustration and not for limitation. In some alternative embodiments, multiple keys may be used to encrypt the auth blobs 510, 515 and recovery blob 520 rather than the single key 505. In many alternative embodiments, the key or keys used for encryption of the blobs or the sensitive data may consist of external keys. Many usage models require the use of keys external to a TPM. For example, to increase encryption speed, one usage model uses symmetric algorithms to encrypt data too large for the TPM to encrypt quickly, and then use the TPM to protect the symmetric key. The TPM may operate slowly at encrypting large amounts of data and may use only a public key asymmetric algorithm. In further alternative embodiments, an external key used to encrypt sensitive data may be placed directly in the auth blobs, rather than authorization data for the key. As a result, the data structure of FIG. 5 may provide upgradeable and recoverable PCR binding to non-TPM keys.

In still other alternative embodiments, the number of blobs, auth blobs and recovery blobs may be larger or smaller than shown in FIG. 5. A number of alternative embodiments may include a single auth blob reflecting the current configuration, and other alternative embodiments may include more than two auth blobs. Many alternative embodiments may omit a recovery blob and several alternative embodiments may include multiple recovery blobs. A few alternative embodiments may include additional data structures not shown in FIG. 5. Some further embodiments may utilize multiple levels of keys. The key used to encrypt an auth blob may in itself be encrypted by another key.

Figure 6:
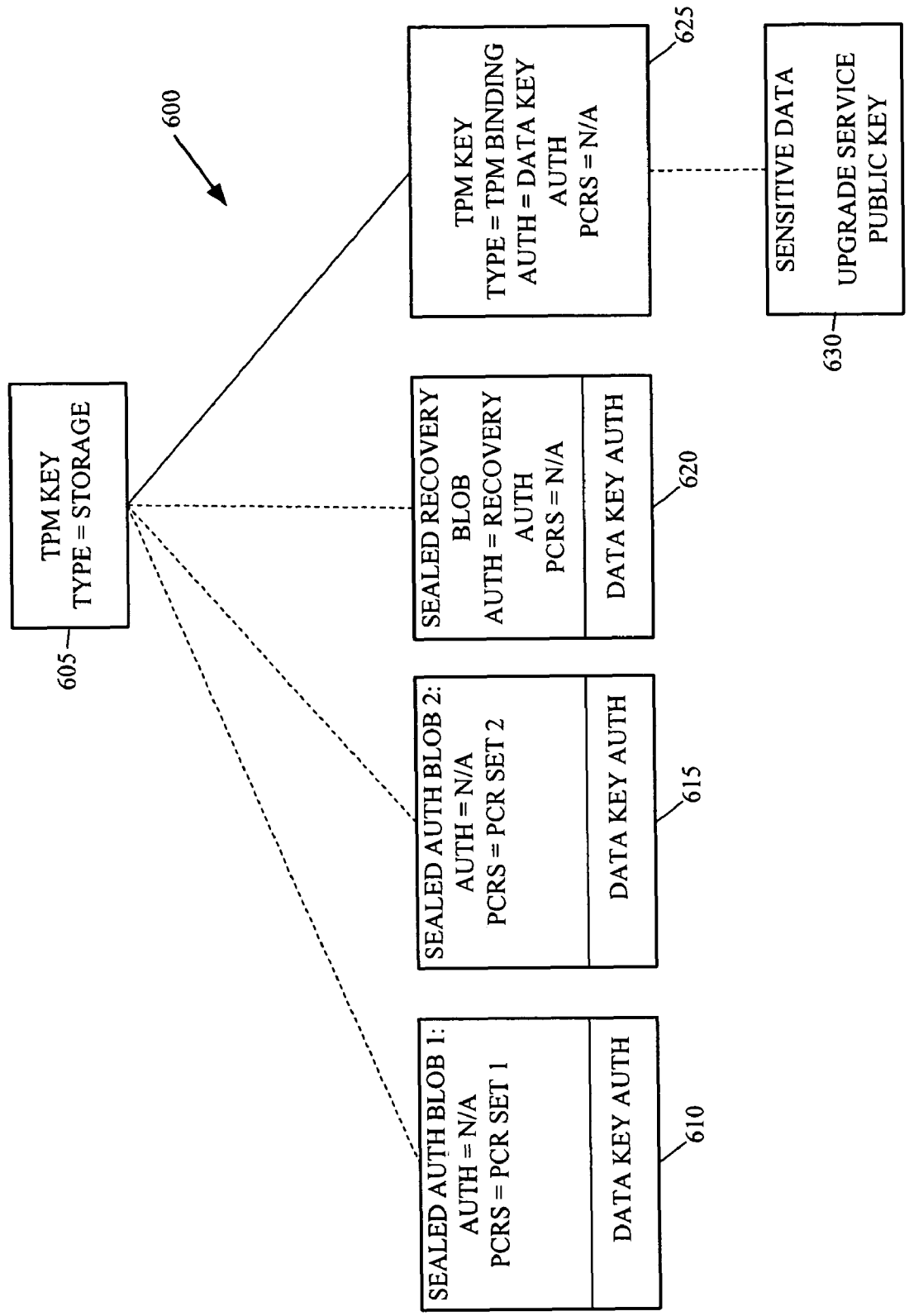
FIG. 6 depicts an exemplary data diagram for controlling access to a cryptographic key which follows the template of FIG. 5.

Turning now to FIG. 6, there is shown an exemplary data diagram 600 for controlling access to a cryptographic key which follows the template of FIG. 5. The diagram includes TPM key 605, authorization blobs 610 and 615, recovery blob 620, TPM key 625, and sensitive data 630. In the embodiment of FIG. 6, TPM key 605 is a storage key. Auth blobs 610 and 615 and recovery blob 620 may be created by the use of the TPM seal function. The command TPM_Seal may take as input a platform configuration and authorization data and produce an encrypted blob that may be unencrypted only in the specified platform configuration and upon presentation of the authorization. Either the authorization or the platform configuration may be omitted. Auth blobs 610 and 615 may be created by using the TPM seal function, specifying a platform configuration and omitting authorization data. Recovery blob 620 may be created by using the TPM seal function, specifying authorization data and omitting a platform configuration.

TPM key 625 is a TPM key used to encrypt sensitive data 630. TPM key 625 may consist of a TPM storage key. TPM key 625 may also be used to encrypt the public key of an upgrade service used to upgrade software utilizing the TPM. TPM key 625 may be encrypted by TPM key 605. TPM key 625 may be locked by data key auth. Presentation of data key auth may be needed to unlock TPM key 625, thereby making TPM key 625 available for unlocking sensitive data 630.

Figure 7:
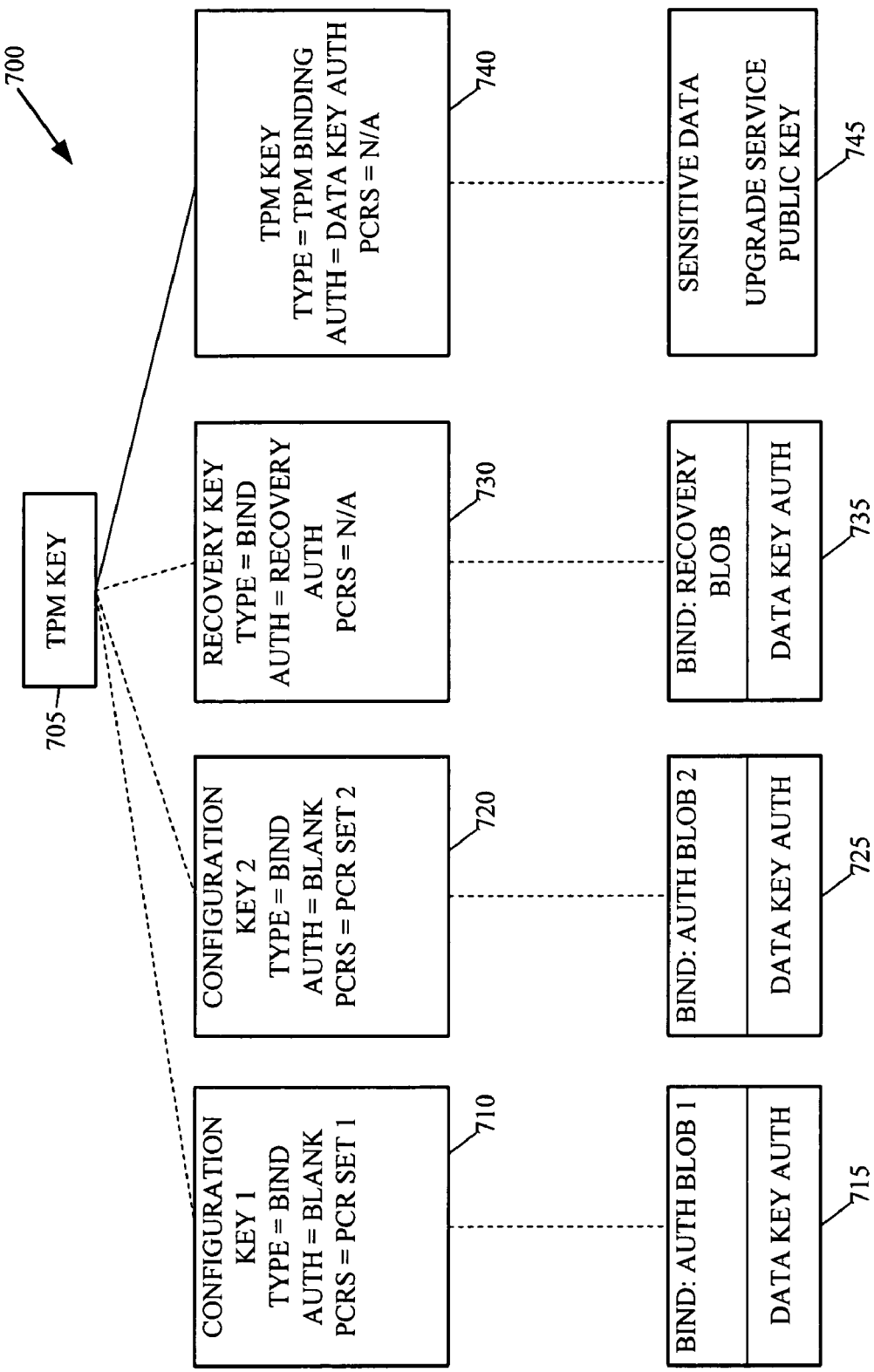
FIG. 7 depicts another exemplary data diagram for controlling access to a cryptographic key which follows the template of FIG. 5.

FIG. 7 is another example data diagram 700 for controlling access to a cryptographic key which follows the template of FIG. 5. In the example of FIG. 7, an additional layer of keys is interposed between the top TPM key and the blobs. The diagram includes TPM key 705; binding keys 710, 720 and 730; blobs 715, 725, and 735; TPM key 740; and sensitive data 745. TPM key 705 is a cryptographic key which may be used to encrypt other data structures in FIG. 7, such as keys 710, 720, and 730.

Binding keys 710, 720, and 730 are TPM keys used to encrypt blobs 715, 725, and 735 respectively. Binding keys may be used to encrypt data. A binding key may consist of the public member of a public/private key pair. A TPM may make the public key available to applications utilizing the services of the TPM. The applications may encrypt data with the public key and may authorize the use of the corresponding private key to decrypt the data. A private key may be retained in a particular TPM. In that case, a message encrypted with the corresponding public key may be decrypted only by the particular TPM (the message is bound to the TPM).

Binding keys may be locked to TPM configurations or authorizations. Data encrypted with the keys may be accessible only when the TPM is in the specified configuration or the authorization is presented. In the example of FIG. 7, binding key 710 is locked to PCR set 1, binding key 720 is locked to PCR set 2, and binding key 730 is locked to recovery auth. Blobs 715, 725, and 735 contain data key auth, authorization data to use TPM key 740.

TPM key 740 is a TPM key used to encrypt sensitive data 745. TPM key 740 may consist of a TPM storage key. TPM key 740 may be encrypted by TPM key 705. In FIG. 7, TPM key 740 is locked by data key auth. Presentation of data key auth may be needed to unlock TPM key 740. Sensitive data 745 may contain the public key of an upgrade service used to upgrade software utilizing the TPM.

In the example of FIG. 7, an application may gain access to sensitive data 745 by searching for a configuration key 710 or 720 which unlocks for the current set of PCR values of the computing platform. The configuration key 710 or 720 may be loaded into a TPM and used to decrypt auth blob 715 or auth blob 725, thereby releasing data key auth. Data key auth may be used to unlock TPM key 740 to decrypt sensitive data 745. Similarly, a recovery authority may gain access to sensitive data by presenting recovery authorization, thereby gaining access to data key auth in blob 735.

In the example of FIG. 7, an application may make sensitive data 745 available under another configuration of the computing platform containing the TPM by generating another TPM binding key and authorizing the other TPM binding key under the other configuration. The application may encrypt data key auth with the other TPM binding key to create another auth blob.

FIG. 6 and FIG. 7 are for illustration and not limitation. Other methods of binding a key to the PCR values of platform configuration and to authorization may be used as may be devised by those of skill in the art. In particular, hybrid methods may be used in a combination of FIG. 6 and FIG. 7. For example, some auth blobs may be created by sealing and some by generation of additional binding keys.

Figure 8:
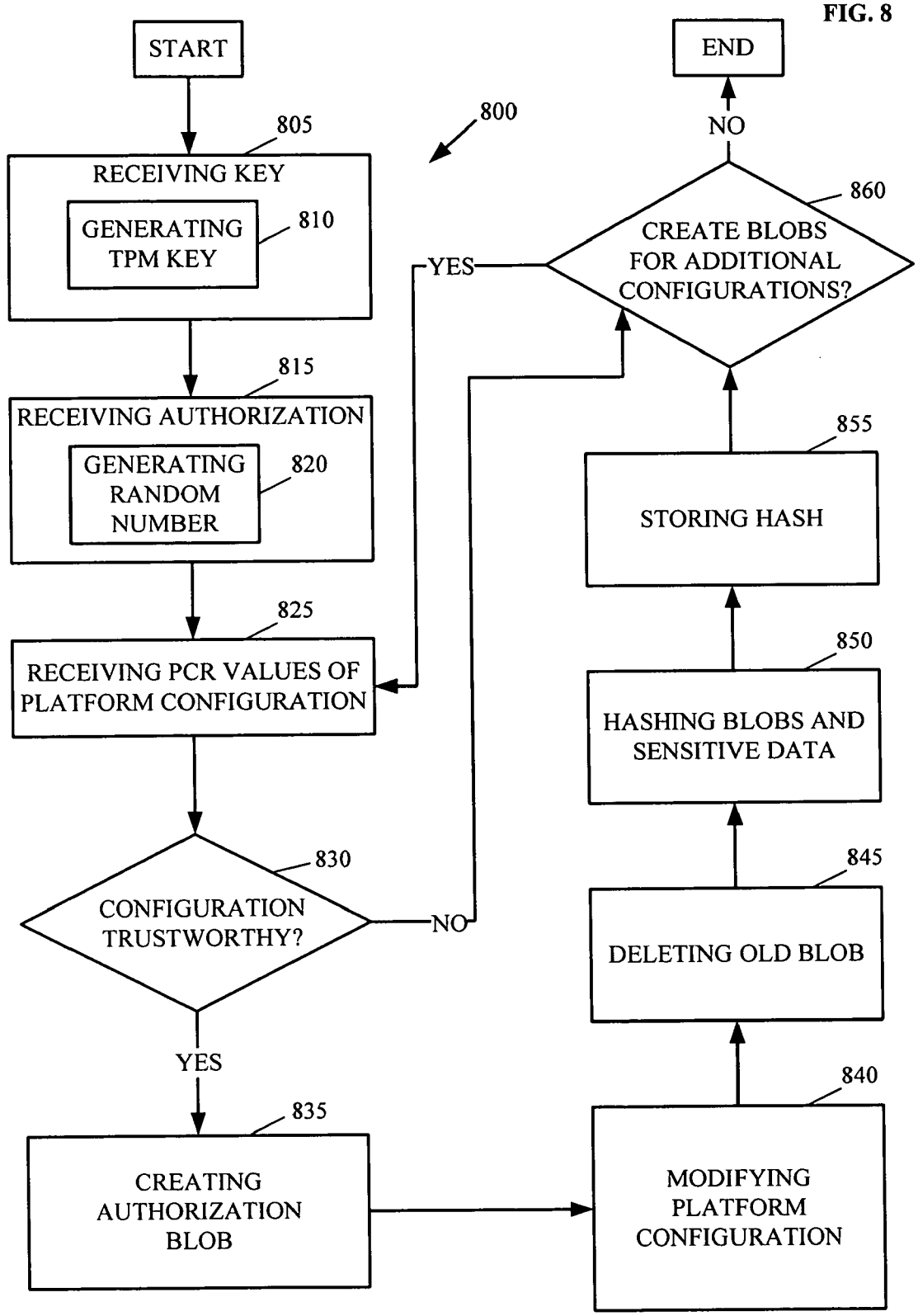
FIG. 8 depicts a flowchart of an embodiment for controlling access to a cryptographic key.

Turning now to FIG. 8, there is shown a flowchart of an embodiment for controlling access to a cryptographic key. Flowchart 800 of FIG. 8 includes receiving a cryptographic key (element 805) by an application which utilizes TPM functions to control access to a cryptographic key (the application). In some embodiments, the cryptographic key may be received from a TPM which generates the key (element 810). In other embodiments, the cryptographic key may be received from other sources. For example, the application may itself create a cryptographic key.

The method of FIG. 8 also includes receiving authorization for the use of the cryptographic key (element 815). Presentation of the authorization may permit use of the cryptographic key available for decryption. In some embodiments, the authorization may be created by generating a random number (element 820). Built-in functions on a TPM, for example, may generate random 160-bit numbers. In other embodiments, the authorization may consist of a password or a hash of a password.

The method of FIG. 8 also includes receiving PCR values of a platform configuration (element 825). In some embodiments, the application may receive the PCR values by obtaining the values after the computing platform is placed in the configuration and the PCR values are measured. In other embodiments, the PCR values may be obtained from an upgrade service.

The application may determine whether the configuration is trustworthy (element 830). For example, the application may receive the configuration from a trusted upgrade service or the configuration may comprise software from a trusted vendor. If so, the application may create an encrypted authorization blob (element 835) which contains the authorization and is bound to the PCR values of the configuration. The blob may be decrypted only when the PCR values of a TPM match the PCR values to which the blob is locked. If the configuration is not trustworthy, the application may determine whether to create blobs for additional configurations (element 860).

In some embodiments, the computing platform may be modified to install software or firmware forming a component of the configuration for which PCR values were received (element 840). One or more applications, other software, or firmware installed on the computing platform may be upgraded; additional applications, software, or components of firmware may be added or deleted; or a newer version of software or firmware may be replaced with an older version. A blob representing a former configuration (old blob) may be deleted (element 845). For example, the old blob may represent an obsolete configuration that was upgraded. In alternative embodiments, however, the old blob may be retained. The old configuration may represent one of several alternative configurations in which a computing platform may be operated.

In order to ensure that a cached version of the deleted old blob is not used to gain access to the sensitive data, an anti-replay mechanism may be used. Once the authorization blobs are updated with the newly-created authorization blob (element 840), the set of authorization blobs for the key and the sensitive data protected by the key may be hashed (element 850). The hash may be stored in non-volatile storage, such as in a DIR or other non-volatile storage of a TPM or in other non-volatile storage on the computing platform (element 855). Thereafter, when the application controlling sensitive data is booted, the application may calculate a hash of the current authorization blobs and sensitive data and compare the hash to the stored hash. If the hashes match, then the authorization blobs are the current set and not an old cached set.

If there are additional configurations to grant access to the sensitive data (element 860), each element of flowchart 800 from element 825 to element 855 may be repeated. Otherwise, controlling access to a cryptographic key may end.

Figure 9:
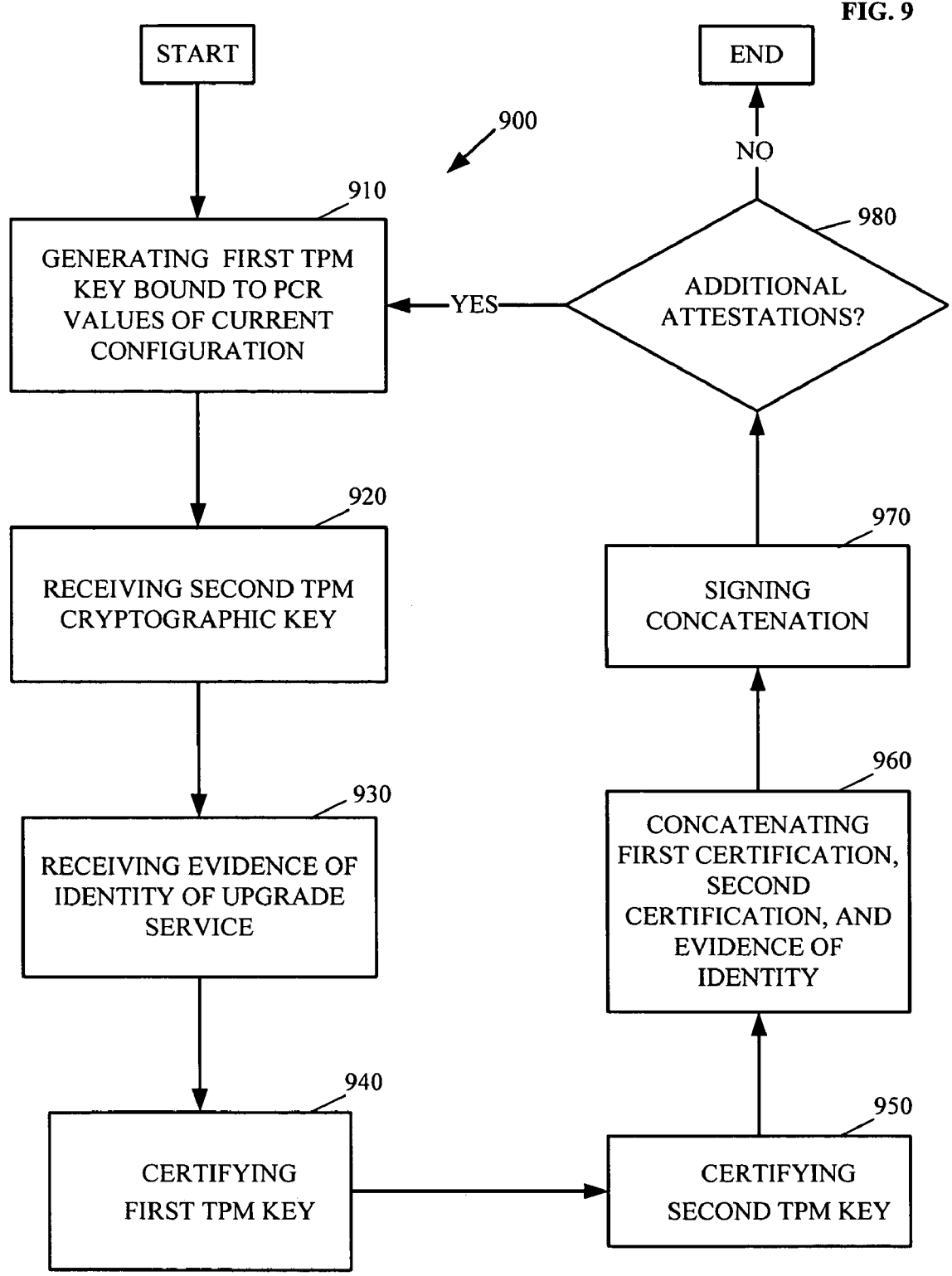
FIG. 9 depicts a flowchart of an embodiment to attest to the approved configurations of a computer platform in which software owns a cryptographic key.

FIG. 9 depicts a flowchart of an embodiment to attest to approved configurations of a computing platform which includes a TPM and software which owns a cryptographic key. Software owns a cryptographic key when the software has access to the key for decrypting messages or other purposes. Flowchart 960 begins with generating a first TPM cryptographic key bound to PCR values representing the trusted computing base and the software with ownership of the cryptographic key (element 910). The first TPM cryptographic key may consist of a TPM identity key. TPM identity keys are asymmetric keys (public/private key pairs) used to sign attestation messages. A TPM identity key may not be transferred from one TPM to another, and may therefore prove the identity of the TPM possessing it. Only the TPM possessing the private key of a public/private identity key pair may be able to decrypt a message encrypted with the public key of the pair. TPM identity keys may be locked to configurations. A trusted computing base may comprise the protection mechanisms within a computing platform that enforce a computer security policy. A trusted computing base may include an operating system, configuration files that control system operation, and any program with rights to alter the kernel of the operating system.

The method of FIG. 9 includes receiving a second TPM cryptographic key, the cryptographic key owned by the software (element 920). The second TPM cryptographic key may be a storage key, a signing key, or another type of key. The software may have access to the key by possessing authorization for the key.

The software may also receive evidence of the identity of an upgrade service (element 930). The identity may consist of the public key of the upgrade service. The identity of the issuer of a public key may be verified by a certification authority, an authority which may verify that a public key was issued by the entity claiming to issue it. The software may also certify the first TPM key, thereby producing a first certification (element 940). For example, if the first TPM key is an identity key, the software may use the TPM_CertifyKey TPM command to direct the first TPM key to certify itself. The command allows a TPM identity key to certify the public portion, including the configuration the key is locked to, of certain TPM keys, including TPM identity keys. Thus, the command may be used to enable an identity key to certify itself.

The software owning the second TPM cryptographic key may also certify the second key, thereby producing a second certification (element 950). For example, the software may use the first TPM cryptographic key to certify the second key. The first and second certifications and the evidence of the identity of the upgrade service may be concatenated (element 960). For example, the two certifications and the public key of the upgrade service may be assembled in a single message. In some embodiments, the concatenation may also include other data. For example, the concatenation may include a certification of a signing key owned by the software.

In addition, the software may sign the concatenation (element 970). Signing a message may verify the identity of the transmitter of a message and verify the integrity of the message during transmission. Signing a message may be accomplished by hashing the message and encrypting the hash with the private key of a public/private key pair. The recipient of the message may hash the message and decrypt the encrypted hash with the public key of the public/private key pair. The recipient may then compare the two hashes. If they are equal, the message may have been unchanged in transmission. In addition, the signing may verify the identity of the sender. Generally, only an entity possessing the private key could have encrypted the hash so that it could be decrypted by the public key. A private key is private information typically known only to the possessor of the private key. In some embodiments, the software may include the signing key in the signed concatenation.

The signed concatenation may offer evidence to a third party that a trustworthy configuration currently has access to the second TPM cryptographic key. First, the signed concatenation may identify the configuration and second TPM cryptographic key and show that the key is accessible in the configuration. If the first TPM cryptographic key is a TPM identity key bound to the configuration, the self-certification of the key may verify the public portion of the key, including the configuration. The certification of the second TPM cryptographic key by the software owning the key may demonstrate that the software has access to the key under the current configuration. The TPM_CertifyKey TPM command may be executed only when the key to be certified is loaded by the TPM. The ability to load the second TPM cryptographic key may demonstrate access to the key under the current configuration.

Further, the identification of the software, the TPM, and the upgrade service by the concatenation may provide evidence to a third party that the configuration with access to the second cryptographic key is trustworthy. The party may have reason to trust the agents involved in the configuration. As a component of the current configuration, the software may have been measured and included in the PCR values. In addition, the TPM may be identified as the owner of the signing key used to sign the concatenation. The inclusion of a certification of the signing key in the concatenation strengthens the evidence. The certification shows that the signing key was accessible in the configuration. Further, the upgrade service may be identified through the evidence of its identity included in the concatenation.

If there are additional requests for attestation to the configuration that keys may be used under, (element 980), elements of flowchart 900 from element 910 to element 970 may be repeated. Otherwise, the attesting of the approved configurations of a computing platform under which TPM cryptographic keys may be used may end.

The elements of FIG. 9 are for illustration and not limitation. In other embodiments, the elements may be performed in a different order, the elements may be combined with additional elements, or some of the elements may be omitted. In some embodiments, the above elements may be used for the production of a certificate from the upgrade service vouching for the trustworthiness of the configuration having access to the key. In these embodiments, software may use the method of FIG. 9 at the time of creating a TPM cryptographic key to produce the signed concatenation. The software may then transmit the signed concatenation to the upgrade service to demonstrate to the upgrade service that the current configuration that can access the keys is trustworthy and that the upgrade service is in control of the software's upgrades. The upgrade service may then issue a credential stating that the key is owned by a platform whose configuration has been approved; that the upgrade service is the only entity which can approve changes in that software; and that the upgrade service will only authorize upgrades that it approves.

The certificate may provide strong evidence that the configuration under which software accesses a key is trustworthy. That configuration may have arisen as the result of a series of upgrades from the initial configuration under which the key was accessible. The certificate may show that the initial configuration was a trusty configuration and that each upgrade leads to a trustworthy configuration. In closed environments, such as the corporate environment, an IT department is a prime candidate to serve as an upgrade service since the IT department is already trusted to manage corporate data.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc., including wireless access mechanisms. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

It will be apparent to those skilled in the art having the benefit of this disclosure that the present invention contemplates methods and arrangements to control access to a cryptographic key and to attest to approved configurations of a computing platform. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controlling access to a cryptographic key, the method comprising:
   receiving a configuration of a computing platform, the configuration comprising Platform Configuration Register (PCR) values of a Trusted Platform Module (TPM) of the computing platform;
   receiving the cryptographic key;
   receiving authorization data for accessing the cryptographic key;
   creating an authorization blob, the authorization blob locking the authorization data to the PCR values of the configuration,
   locking the cryptographic key to the authorization data, wherein the cryptographic key is stored outside of the authorization blob and the cryptographic key is a TPM key;
   deleting another authorization blob locking the authorization data to a measurement of another configuration of the computing platform;
   hashing one or more authorization blobs locking the authorization data to one or more configurations of the computing platform after the creating, the one or more hashed authorization blobs including the authorization blob and not including the deleted authorization blob, thereby creating a first hash;
   storing the first hash;
   booting the computing platform after the deleting;
   hashing one or more currently loaded authorization blobs locking the authorization data to one or more configurations of the computing platform, thereby creating a second hash, wherein the one or more currently loaded authorization blobs are currently loaded after the booting;
   comparing the first hash and the second hash; and
   accessing the cryptographic key, based upon a determination that the first hash matches the second hash.

2. The method of claim 1, further comprising creating another authorization blob containing the authorization data, the authorization blob accessible by a recovery authority, the authorization blob locked to authorization data possessed by the recovery authority.

3. The method of claim 1, wherein
   the method further comprises receiving from an upgrade service software upgrades and a specification of PCR values;
   the method further comprises installing the software upgrades, thereby upgrading the computing platform to a configuration of the computing platform as measured by the PCR values; and the creating comprises creating an authorization blob, the authorization blob locking the authorization data to the PCR values received from the upgrade service.

4. The method of claim 1, wherein the receiving the cryptographic key comprises creating a TPM data encryption key.

5. The method of claim 1, wherein the receiving the cryptographic key comprises creating a TPM signing key.

6. The method of claim 1, wherein the creating comprises:
receiving a TPM storage key; and
sealing the authorization data to the configuration of the computing platform with the TPM storage key.

7. The method of claim 6, wherein:
the method further comprising creating another authorization blob, the authorization blob sealing the authorization data to another configuration of the computing platform with the TPM storage key;
the method further comprising creating a third authorization blob containing the authorization data, the authorization blob accessible by a recovery authority, the authorization blob locked to authorization data possessed by the recovery authority, wherein the recovery authority constitutes a corporate information technology (IT) department; and
locking the cryptographic key to the authorization data comprises locking a public key of an update service to the authorization data.

8. The method of claim 1, wherein the creating comprises:
creating a TPM configuration key;
binding the TPM configuration key to the configuration of the computing platform; and
encrypting the authorization data with the TPM configuration key.

9. The method of claim 8, wherein:
the method further comprising creating another authorization blob, the authorization blob binding the TPM configuration key to another configuration of the computing platform;
the method further comprising creating a third authorization blob containing the authorization data, the authorization blob accessible by a recovery authority; the authorization blob locked to authorization data possessed by the recovery authority, wherein the recovery authority constitutes a corporate IT department; and
locking the cryptographic key to the authorization data comprises locking a public key of an update service to the authorization data.

10. The method of claim 1, wherein the receiving a configuration comprises receiving the configuration of the computing platform, the configuration comprising PCR values of the TPM of the computing platform, the PCR values representing a trusted computing base of the computing platform and software with ownership of the cryptographic key.

11. A method for controlling access to a cryptographic key, the method comprising:
receiving a configuration of a computing platform, the configuration comprising Platform Configuration Register (PCR) values of a Trusted Platform Module (TPM) of the computing platform, wherein the TPM is a virtual TPM and the receiving is by the virtual TPM;
receiving by the virtual TPM the cryptographic key;
receiving by the virtual TPM authorization data for accessing the cryptographic key;
creating by the virtual TPM a first authorization blob, the authorization blob locking the authorization data to the PCR values of the configuration, and locking the cryptographic key to the authorization data, wherein the cryptographic key is stored outside of the authorization blob and the cryptographic key is a TPM key;
receiving other PCR values of the virtual TPM;
creating another authorization blob, the authorization blob locking the authorization data to the other PCR values;
after creating the other authorization blob, releasing the authorization data from the other authorization blob when the virtual TPM is in a configuration as specified by the other PCR values; and
after creating the other authorization blob, releasing the authorization data from the first authorization blob when the virtual TPM is in a configuration as specified by the PCR values.

12. A method for attesting to a configuration of a computing platform, the computing platform comprising a trusted computing base and software, wherein the software has access to a Trusted Platform Module (TPM) cryptographic key under the configuration of the computing platform, the TPM cryptographic key not sealed to the configuration of the computing platform, the method comprising:
generating by the software a TPM identity key, the TPM identity key sealed to platform configuration register (PCR) values representing a current configuration of the trusted computing base;
receiving by the software evidence of an identity of an upgrade service controlling the upgrading of software on the computing platform, wherein the upgrade service is to transmit software upgrades to the computing platform over a network, examine configurations of the computing platform, and approve or disapprove of configurations of the computing platform, the receiving comprising receiving a public key of the upgrade service;
certifying by the software the TPM identity key, the certifying comprising the TPM identity key certifying itself, the certification identifying the TPM identity key and the PCR values, thereby producing a first certification;
certifying by the software the TPM cryptographic key, thereby producing a second certification; wherein certifying the TPM cryptographic key comprises certifying the TPM cryptographic key with the TPM identity key;
concatenating by the software the first certification, the second certification, and the public key of the upgrade service, thereby producing a concatenation; and
signing by the software the concatenation.

13. The method of claim 12, further comprising proving to the upgrade service the trustworthiness of the current configuration of the trusted computing base and the software.

14. The method of claim 13, wherein:
the TPM cryptographic key was created under a current configuration of the trusted computing base and the software; and
the method further comprises issuing by the upgrade service a credential stating that the TPM cryptographic key is owned by a computing platform with an approved configuration, that the upgrade service is the only entity to approve changes in the software of the platform, and that the upgrade service will only authorize upgrades that the upgrade service approves.

15. A trusted platform module (TPM), the TPM comprising:
a configuration module to receive a configuration of a computing platform, the configuration comprising Platform Configuration Register (PCR) values of the TPM;
a cryptographic module to receive a cryptographic key and to receive authorization data for accessing the cryptographic key;

a storage module to:
create an authorization blob, wherein the authorization blob locks the authorization data to the PCR values of the configuration of the computing platform; and
lock the cryptographic key to the authorization data; wherein the cryptographic key is stored outside of the authorization blob; and
an anti-replay module to:
delete another authorization blob locking the authorization data to a measurement of another configuration of the computing platform;
hash one or more authorization blobs locking the authorization data to one or more configurations of the computing platform after the creating, the one or more hashed authorization blobs including the authorization blob and not including the deleted authorization blob, thereby creating a first hash;
store the first hash;
boot the computing platform after the deleting;
hash one or more currently loaded authorization blobs locking the authorization data to one or more configurations of the computing platform, thereby creating a second hash, wherein the one or more authorization blobs are currently loaded after the booting;
compare the first hash and the second hash; and
access the cryptographic key, based upon a determination that the first hash matches the second hash;
receive a configuration of the computing platform, the configuration comprising Platform Configuration Register (PCR) values of a Trusted Platform Module (TPM) of the computing platform.

16. The TPM of claim 15, wherein:
the cryptographic module comprises a generation module to create a TPM storage key; and
the storage module comprises logic to seal the authorization data to the configuration of the computing platform with the TPM storage key.

17. The TPM of claim 15, wherein:
the cryptographic module comprises a generation module to create a TPM configuration key and an encryption module to encrypt the authorization data with the TPM configuration key; and
the storage module comprises logic to lock the TPM configuration key to the configuration of the computing platform.

18. A machine-readable storage medium to control access to a cryptographic key, the medium having one or more associated instructions, wherein the one or more instructions, when executed, cause a computing platform to:
receive the cryptographic key;
receive authorization data for accessing the cryptographic key;
create an authorization blob, the authorization blob locking the authorization data to the PCR values of the configuration;
lock the cryptographic key to the authorization data, wherein the cryptographic key is stored outside of the authorization blob;
delete another authorization blob locking the authorization data to a measurement of another configuration of the computing platform;
hash one or more authorization blobs locking the authorization data to one or more configurations of the computing platform after the creating, the one or more hashed authorization blobs including the authorization blob and not including the deleted authorization blob, thereby creating a first hash;
store the first hash;
boot the computing platform after the deleting;
hash one or more currently loaded authorization blobs locking the authorization data to one or more configurations of the computing platform, thereby creating a second hash, wherein the one or more currently loaded authorization blobs are currently loaded after the booting;
compare the first hash and the second hash; and
access the cryptographic key, based upon a determination that the first hash matches the second hash.

19. The medium of claim 18, wherein the one or more instructions, when executed, further cause the computing platform to create another authorization blob containing the authorization data for the cryptographic key, the authorization blob accessible by a recovery authority, the authorization blob locked to authorization data possessed by the recovery authority.

20. The medium of claim 18, wherein causing the computing platform to receive a cryptographic key comprises causing the computing platform to create a TPM data encryption key.

21. The medium of claim 18, wherein causing the computing platform to receive a cryptographic key comprises causing the computing platform to create a TPM signing key.

22. The medium of claim 18, wherein causing the computing platform to create comprises causing the computer platform to:
receive a TPM storage key; and
seal the authorization data to the configuration of the computing platform with the TPM storage key.

23. The medium of claim 18, wherein causing the computing platform to create an authorization blob comprises causing the computing platform to:
create a TPM configuration key;
lock the TPM configuration key to the configuration of the computing platform; and
encrypt the authorization data with the TPM configuration key.

24. The medium of claim 18, wherein:
causing the computing platform to receive the cryptographic key, authorization data, and a configuration of the computing platform comprises causing the computing platform to receive by a virtual TPM the cryptographic key, the authorization data, and the configuration of the computing platform; and
causing the computing platform to create an authorization blob comprises causing the computing platform to create the authorization blob by the virtual TPM.

25. The medium of claim 18, wherein:
causing the computing platform to receive the cryptographic key comprises causing the computing platform to receive a TPM cryptographic key;
the computing platform comprises a trusted computing base;
and
the one or more instructions, when executed, cause the computing platform to:
generate by software another TPM cryptographic key, the other TPM cryptographic key sealed to PCR values representing a current configuration of the trusted computing base and the software, wherein the software has access to the TPM cryptographic key under the configuration of the computing platform, and the TPM cryptographic key is not sealed to the PCR values representing a current configuration of the computing platform;

receive by the software evidence of an identity of an upgrade service controlling the upgrading of software on the computing platform, wherein the upgrade service is to transmit software upgrades to the computing platform over a network, examine configurations of the computing platform, and approve or disapprove of configurations of the computing platform;

certify by the software the other TPM cryptographic key, the certification identifying the other TPM cryptographic key and the PCR values, thereby producing a first certification;

certify by the software the TPM cryptographic key, thereby producing a second certification;

concatenate by the software the first certification, the second certification, and the evidence of the identity of the upgrade service, thereby producing a concatenation; and sign by the software the concatenation.

26. The medium of claim 25, wherein the one or more instructions, when executed, further cause the computing platform to:

prove to the upgrade service the trustworthiness of the current configuration of the trusted computing base and the software.

27. The medium of claim 25, wherein:

causing the computing platform to generate another TPM cryptographic key comprises causing the computing platform to generate a TPM identity key bound to the PCR values;

causing the computing platform to certify the other TPM cryptographic key comprises causing the other TPM cryptographic key to certify itself;

causing the computing platform to receive evidence of an identity of the upgrade service comprises causing the computer platform to receive a public key of the upgrade service;

causing the computing platform to certify the TPM cryptographic key comprises causing the machine computer platform to certify the TPM cryptographic key with the TPM identity key; and causing the computing platform to concatenate comprises causing the computer platform to concatenate the first certification, the second certification, and the public key of the upgrade service.

* * * * *

UNITED STATES PATENT AND TRADEMARK OFFICE
CERTIFICATE OF CORRECTION

PATENT NO. : 7,711,960 B2  Page 1 of 1
APPLICATION NO. : 11/511773
DATED : May 4, 2010
INVENTOR(S) : Vincent Scarlata It is certified that error appears in the above-identified patent and that said Letters Patent is hereby corrected as shown below:

In the Claims:

In column 19, lines 27-31, in claim 15, delete "hash; receive a configuration of the computing platform, the configuration comprising Platform Configuration Register (PCR) values of a Trusted Platform Module (TPM) of the computing platform." and insert -- hash. --, therefor.

In column 19, line 50, in claim 18, before "receive" insert -- receive a configuration of the computing platform, the configuration comprising Platform Configuration Register (PCR) values of a Trusted Platform Module (TPM) of the computing platform; --.

Signed and Sealed this

Third Day of August, 2010

David J. Kappos
*Director of the United States Patent and Trademark Office*